(12) United States Patent
Hauvespre et al.

(10) Patent No.: US 10,697,322 B2
(45) Date of Patent: Jun. 30, 2020

(54) TURBOCHARGER, NOTABLY FOR A COMBUSTION ENGINE

(71) Applicant: Aktiebolaget SKF, Gothenburg (SE)

(72) Inventors: Benoît Hauvespre, Saint Etienne de Chigny (FR); Charles Chambonneau, Ballan Miré (FR); Nicolas Tronquoy, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/983,182

(22) Filed: May 18, 2018

(65) Prior Publication Data
US 2018/0355758 A1 Dec. 13, 2018

(30) Foreign Application Priority Data

Jun. 8, 2017 (DE) .......................... 10 2017 209 672

(51) Int. Cl.
*F01D 25/16* (2006.01)
*F16C 33/41* (2006.01)
(Continued)

(52) U.S. Cl.
CPC ............. *F01D 25/16* (2013.01); *F01D 25/18* (2013.01); *F02C 6/12* (2013.01); *F16C 19/163* (2013.01); *F16C 19/548* (2013.01); *F16C 33/414* (2013.01); *F16C 33/418* (2013.01); *F16C 33/6659* (2013.01); *F16C 33/6681* (2013.01);
(Continued)

(58) Field of Classification Search
CPC .......... F01D 25/16; F01D 25/18; F02B 37/00; F02C 6/12; F05D 2220/40; F05D 2240/50; F05D 2240/54; F16C 33/418; F16C 33/6659; F16C 33/6681; F16C 19/163; F16C 19/548; F16C 2360/24; F16C 33/414
See application file for complete search history.

(56) References Cited

U.S. PATENT DOCUMENTS 3,937,535 A * 2/1976 Ladin ................... B60B 27/0005
384/540
5,076,766 A 12/1991 Gutknecht
(Continued)

FOREIGN PATENT DOCUMENTS

EP 2657553 B1 10/2013

*Primary Examiner* — Jesse S Bogue
(74) *Attorney, Agent, or Firm* — Garcia-Zamor Intellectual Property Law, LLC; Ruy Garcia-Zamor; Bryan Peckjian

(57) ABSTRACT

A turbocharger having a rotatable shaft, a stationary housing, a turbine wheel mounted on one end of shaft, a compressor wheel mounted onto an opposite end of shaft, and at least one rolling bearing disposed between the shaft and the housing. The rolling bearing includes a stationary outer ring fixed to the housing, a rotatable inner ring fixed to the shaft, at least one row of balls disposed in a rolling chamber defined between the outer ring and inner ring, and an annular non-deformable cage providing circumferentially a plurality of through holes forming pockets where the balls are housed. The pockets being axially delimited between annular cage heels. Each pocket of cage is extended by a slot through one of cage heels, the cage heel provided with the slots being axially oriented towards the interior side of turbocharger.

7 Claims, 2 Drawing Sheets

(51) Int. Cl.
*F16C 33/66* (2006.01)
*F16C 19/16* (2006.01)
*F16C 19/54* (2006.01)
*F01D 25/18* (2006.01)
*F02C 6/12* (2006.01)
*F02B 37/00* (2006.01)

(52) U.S. Cl.
CPC .......... *F02B 37/00* (2013.01); *F05D 2220/40* (2013.01); *F05D 2240/50* (2013.01); *F05D 2240/54* (2013.01); *F16C 2360/24* (2013.01)

(56) References Cited

U.S. PATENT DOCUMENTS

| | | | | |
|---|---|---|---|---|
| 5,575,570 A * | 11/1996 | Uchiyama | ............ | F16C 33/416 |
| | | | | 384/470 |
| 5,911,579 A * | 6/1999 | Nakanishi | ............ | A61C 1/181 |
| | | | | 433/132 |
| 6,315,456 B1 * | 11/2001 | Tanimoto | ............ | F16C 19/163 |
| | | | | 29/898.067 |
| 6,332,717 B1 * | 12/2001 | Oohira | ............ | F16C 33/416 |
| | | | | 384/470 |
| 6,682,224 B2 * | 1/2004 | Ooitsu | ............ | F16C 19/163 |
| | | | | 384/527 |
| 6,808,310 B2 * | 10/2004 | Ooitsu | ............ | F16C 19/163 |
| | | | | 384/492 |
| 7,198,408 B2 * | 4/2007 | Yamamoto | ............ | F16C 19/18 |
| | | | | 384/531 |
| 7,364,365 B2 * | 4/2008 | Begin | ............ | F16C 33/3831 |
| | | | | 384/530 |
| 8,529,135 B2 * | 9/2013 | Duffy | ............ | F16C 33/6681 |
| | | | | 384/385 |
| 8,622,622 B2 * | 1/2014 | Solfrank | ............ | F16C 33/3806 |
| | | | | 384/470 |
| 9,115,761 B2 * | 8/2015 | Mavrosakis | ............ | F16C 33/585 |
| 9,523,389 B2 * | 12/2016 | Schmidt | ............ | F16C 33/6659 |
| 9,546,681 B2 * | 1/2017 | Sasaki | ............ | F16C 43/08 |
| 9,829,042 B2 * | 11/2017 | Batalha | ............ | F16C 33/6629 |
| 9,939,017 B2 * | 4/2018 | Maeoka | ............ | F16H 49/001 |
| 10,132,350 B2 * | 11/2018 | Schmidt | ............ | F16C 35/067 |
| 2008/0267548 A1 | 10/2008 | Chriss | | |
| 2011/0002568 A1 * | 1/2011 | Kawamura | ............ | F16C 33/416 |
| | | | | 384/470 |
| 2012/0051906 A1 * | 3/2012 | House | ............ | F01D 25/16 |
| | | | | 415/229 |
| 2016/0178008 A1 * | 6/2016 | Scothern | ............ | F16C 33/467 |
| | | | | 384/502 |

* cited by examiner

TURBOCHARGER, NOTABLY FOR A COMBUSTION ENGINE

CROSS-REFERENCE

This application claims priority to German patent application no. 102017209672.1 filed on Jun. 8, 2017, the contents of which are fully incorporated herein by reference.

TECHNOLOGICAL FIELD

The present invention relates to the field of turbochargers, and in particular those used in combustion engines for automotive vehicles.

BACKGROUND

A turbocharger is used in automotive vehicles to enhance the combustion engine performance by blowing compressed air into the cylinders of the engine.

A turbocharger generally comprises a housing and a shaft extending through an opening formed on the housing. A turbine wheel is mounted on a first end portion of the shaft and located in an exhaust gases passage of the combustion engine. A compressor wheel is mounted on an opposite second end portion of the shaft and located in an admission gases passage of the engine. Turbocharger further comprises rolling bearings disposed between the shaft and housing.

Rolling bearings are preferably located at each end of shaft. Rolling bearings generally comprise each a stationary outer ring fixed in housing, a rotating inner ring fixed with rotating shaft, a set of balls radially arranged between the rings, and a cage that circumferentially maintain the balls. Cage is annular and comprises a plurality of through holes forming pockets wherein balls are housed. Pockets are axially delimited between annular heels so as to firmly axially maintain the balls during high rotation speed from 50 000 rpm up to 350 000 rpm.

When the turbine wheel is rotated by the flow of the exhaust gases, the shaft and the compressor wheel are rotated which leads to a compression of the admission gases introduced into the cylinders of the combustion engine.

Turbocharger works at very high speed and lead to important temperatures within, in particular in bearings. It is therefore necessary to efficiently lubricate the bearings to avoid any extra heating and failure.

It is known from U.S. Pat. No. 5,076,766 to provide lubrication ducts to the stationary outer ring so that lubricant can be supplied in the radial space defined between the outer and inner rings. Advantageously, lubrication duct extend along an injection direction towards the balls of rolling bearings. In EP-B1-2657553 and US-A1-2008/267548, inner rings further comprise annular grooves with inclined wall so as to direct the injected lubricant towards the balls.

However, the cage heel oriented towards the interior of turbocharger forms a bottle neck for lubricant. The radial space between inner and outer rings is strongly reduced by the annular cage heel, even with an annular radial groove on inner ring that extend within the cage heel. The blocking effect is increased by the high rotation speed of cage.

SUMMARY

The aim of the invention is to solve the above difficulties. It is proposed a turbocharger with rolling bearings provided with improved cage for lubrication of balls. It is a particular object of the present invention to provide a turbocharger which is simple to manufacture and economic, while guaranteeing an optimized service life.

To this end, the invention relates to a turbocharger comprising a rotatable shaft, a stationary housing, a turbine wheel mounted on one end of shaft, a compressor wheel mounted onto an opposite end of shaft, and at least one rolling bearing disposed between the shaft and the housing. The rolling bearing comprises a stationary outer ring fixed to the housing, a rotatable inner ring fixed to the shaft, at least one row of balls disposed in a rolling chamber defined between the outer and inner rings, and an annular metal cage substantially non-deformable and comprising circumferentially a plurality of through holes forming pockets wherein balls are housed, pockets being axially delimited between annular cage heels.

According to the invention, each pocket of cage is extended by a slot through one of cage heels, the cage heel provided with the slots being axially oriented towards the interior side of turbocharger.

In the meaning of the present invention, a slot consists in a through radially and axially opening. The slot extends in axial direction from the through hole of a pocket through one of the cage heels, and extends in radial direction through the cage radial thickness between cage bore and cage outer surface.

In the meaning of the invention, the cage is considered as substantially non-deformable in the present application. The scope of the present invention excludes cages with at least one deformable part that are not suitable for use in turbocharger application at very high rotation speed, i.e. greater than at least 50 000 rpm. Such cage has a Young Modulus greater than 200 000 MPa. More particularly, the invention excludes plastic cages and cages provided with snapping pockets for balls. Cage for a turbocharger application has to firmly maintain balls at very high rotation speed of shaft and inner ring.

Thanks to the invention, passage for lubricant is increased which allow lubricant to better spread in the interior of the bearing and particularly on balls arranged in cage. It avoids the drawbacks of a full cage heel in the turbocharger interior side.

According to further aspects of the invention which are advantageous but not compulsory, such a turbocharger may incorporate one or several of the following features:

- At least one lubrication duct is provided through the stationary outer ring to supply lubricant in the rolling chamber.
- Lubrication duct extends obliquely along an injection direction towards the vicinity of balls of rolling bearing.
- Inner ring comprises at least one annular groove with inclined wall and in the axial vicinity of balls of rolling bearing.
- Cage is cylindrical.
- Cage is made of steel.
- Cage radial thickness is comprised between 20% and 50% of balls diameter, and advantageously equal to 37.5%.
- Each slot has edges that extend axially.
- Each slot has edges that extend each obliquely in opposite directions from the pocket through the cage heel so as to form a dovetail shape.
- Each slot has edges that extend parallelly and obliquely in one direction from the pocket through the cage heel.
- Each oblique slot is oriented in the same direction as the rotation direction of the inner ring.

BRIEF DESCRIPTION OF THE DRAWINGS

The invention will now be explained in correspondence with the annexed figures, as illustrative examples, without restricting the object of the invention. In the annexed figures.

DETAILED DESCRIPTION

Figure 1:
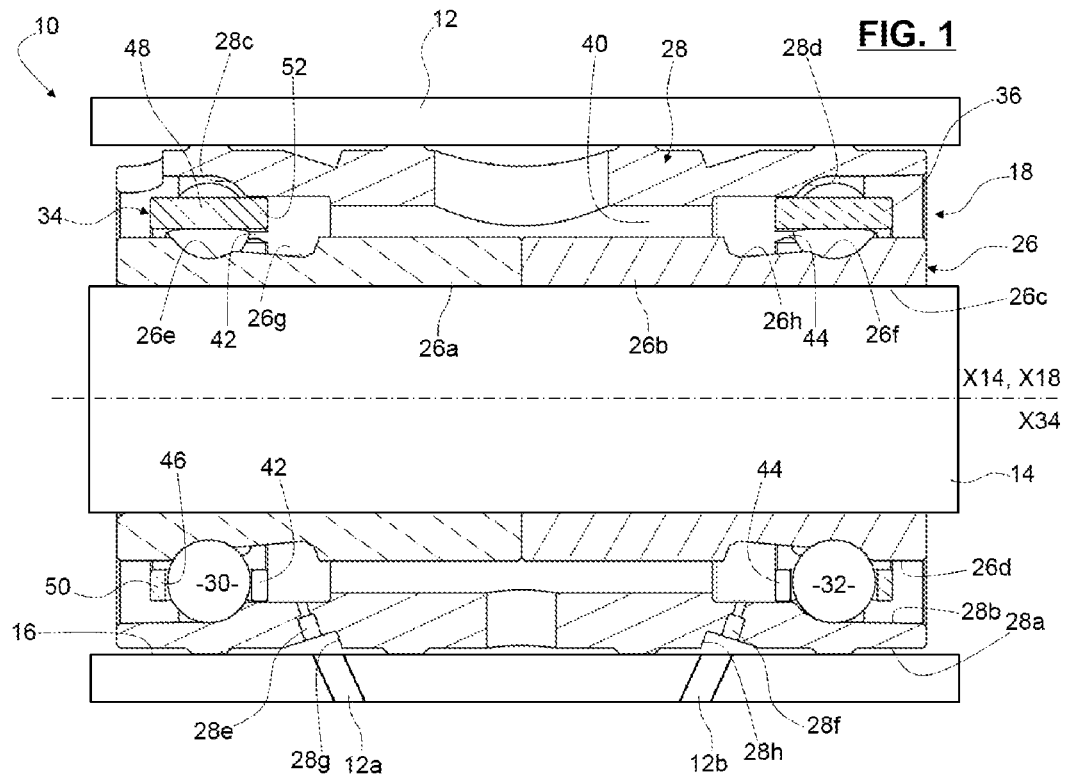
FIG. 1 is an axial section of a turbocharger according to a first embodiment of the invention.

As illustrated on the FIG. 1, which illustrated an embodiment of a turbocharger 10 according to an example of the invention, the turbocharger comprises a stationary housing 12, a rotating shaft 14 extending along a longitudinal axis X14 through a cylindrical bore or opening 16 of housing 12, and a rolling bearing 18 mounted onto shaft 14 and disposed into the bore 16. A non-shown turbine wheel is fixed at one end of shaft 14 and a non-shown compressor wheel is fixed at an axially opposite end of the shaft.

Rolling bearing 18 comprises an inner ring 26 and an outer ring 28 between which are housed two rows of balls 30 and 32. Rolling bearing 18 further comprises two annular cages 34 and 36 maintaining the circumferential spacing of the balls 30 and 32, respectively.

Axis X18 of rolling bearing 18 is coaxial with the longitudinal axis X14 of shaft 14 of turbocharger 10.

Inner and outer rings 26, 28 are concentric and advantageously symmetric with respect to a transverse radial plane passing through the center of the rolling bearing 18. Rings 26, 28 are of the solid type, i.e. rings are obtained by machining with removal of material (by machining grinding) from metal tube stock, bar stock, rough forging and/or roller blanks.

Outer ring 28 comprises an outer surface 28a fitted into bore 16 of housing 12. Outer ring 28 is securely fixed within the stationary housing 12 by any suitable means. Outer ring 28 further comprises an inner bore 28b of substantial cylindrical shape from which are formed toroidal raceways 28c and 28d having in cross-section a concave internal profile adapted to balls 30 and 32, respectively. Raceways 28c, 28d are directed radially inwards. Advantageously, the raceways are symmetrical with respect to the transverse radial plane passing through the center of the rolling bearing 18. Alternatively, outer ring may comprise a plurality of parts that are mounted axially fixedly one against the other.

Inner ring 26 is made in two parts 26a, 26b which are identical, symmetrical with respect to the transverse radial plane of symmetry of the rolling bearing 18 and mounted axially fixedly one against the other. Then inner ring 26 is here composed of two identical half-rings 26a, 26b. Alternatively, inner ring may be made in one part. Inner ring 26 comprises a bore 26c of substantial cylindrical shape into which the shaft 14 is fitted. Inner ring 26 is fastened in rotation with the rotating shaft 14 by any suitable means. Inner ring 26 further comprises an outer surface 26d of substantial cylindrical shape onto which are formed toroidal raceways 26e and 26f having in cross-section a concave internal profile adapter to balls 30 and 32, respectively. Raceways 26e, 26f are directed radially inwards. Advantageously, the raceways are symmetrical with respect to the transverse radial plane passing through the center of the rolling bearing 18.

An annular rolling chamber 40 is defined between the inner and outer rings 26, 28 in which balls 30, 32 and the associated cages 34, 36 are housed. The two rows of balls 30, 32 are located in the vicinity of the axial ends of rolling bearing 18. An interior side of the rolling bearing 18 of turbocharger 10 is then defined axially between the two rows of balls 30, 32.

Cages 34, 36 are non-deformable to firmly maintain balls 30, 32 at very high rotation speed of shaft 14 and inner ring 26.

Cages 34, 36 are cylindrical and are of radial thickness comprised between 20% and 50% of diameter of balls 30, 32, and advantageously equal to 37.5% as illustrated in the embodiment of FIG. 1.

As an alternate not shown, the turbocharger 10 may comprise sealing means so as to seal the rolling chamber of rolling bearing.

In order to improve the service life of rolling bearing 18, hence of turbocharger 10, and increase its rotation speed range, rolling bearing 18 and housing 12 are equipped with a lubrication system in the present embodiment. Housing 12 comprises at least two lubrication ducts 12a and 12b which open in bore 16. Outer ring 28 comprises at least two lubrication ducts 28e and 28f extending between the outer surface 28a and inner bore 28b of outer ring 28. Lubrication ducts 12a and 12b of housing 12 are fed with lubricant from a non-shown lubricant reservoir outside turbocharger 10, then lubricant flows in lubrication ducts 28e and 28f, respectively, and is injected in rolling chamber 40.

Openings of lubrication ducts 28e and 28f on outer surface 28a of outer ring 28 are provided in annular grooves 28g and 28h, respectively, so as to permit a limited number of lubrication ducts 12a, 12b through housing 12.

Advantageously, outer ring 28 comprises two sets of lubrication ducts 28e and 28f, each set comprising circumferentially a plurality of lubrication ducts, adapted to inject lubricant in the vicinity of the two rows of balls 30 and 32, respectively.

In the embodiment of FIG. 1, lubrication ducts 28e, 28f are each extending obliquely along an injection direction towards the balls 30, 32 respectively, of rolling bearing 18. This permit to better orientate the lubricant injection towards the critical areas where lubrication is specifically needed, particularly the balls 30, 32 and the associated raceways 26e, 26f on inner ring 26.

Grooves 26g, 26h are provided on the outer surface 26d of inner ring 26 in the vicinity of raceways 26e, 26f, respectively. Grooves 26g, 26h comprise inclined walls towards the raceways. Lubricant is then conveyed by grooves 26e, 26f, and the rotation of inner ring 26 induces the flowing of lubricant from grooves 26g, 26h to raceways 26e, 26f by the grooves inclined walls.

In order to optimize the lubricant repartition and circulation towards balls 30 and 32, cages 34 and 36 comprise slots 42 and 44, respectively.

Cages 34 and 36 are identical and symmetrical with respect to the transverse radial plane passing through the center of the rolling bearing 18. Then only one of the cages will be further described.

Cage 34 is made of metal and is annular around a longitudinal axis X34 coaxial with the longitudinal axis X18 of rolling bearing 18 after assembly.

Cage 34 comprises a plurality of pockets 46 formed through the radial cage thickness. Pockets 46 are cylindrical in the radial direction and are adapted to receive each a ball 30. Each pocket 46 is circumferentially separated to the adjacent one by a spacing portion 48.

Pockets 46 are circumferentially equally spaced. Alternatively, pockets 46 are unevenly distributed over the circumference of cage 34.

Pockets 46 are axially delimited by a first cage heel 50 on one axial side and by a second cage heel 52 on the opposite axial side of cage 34. Cage thickness and cage heels have to be of significant dimensions and non-deformable so as to firmly axially maintain the balls during high speed rotation. More particularly, cages with snapping pockets for balls are prevented for use in turbocharger application.

Figure 2:
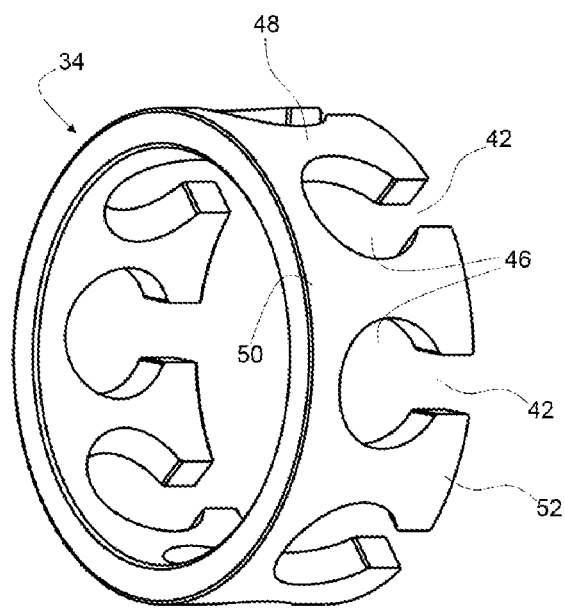
FIG. 2 is a perspective view of a cage of the turbocharger.

According to the invention, each of pockets 46 is extended by a slot 42 through the second cage heel 52. Slots consist in through radially and axially openings that extend in axial direction from the through hole of a pocket 42 through the cage heel 52, and extend in radial direction through the cage radial thickness between cage bore and cage outer surface. In the first embodiment of the invention as illustrated in FIGS. 1 and 2, slots 42 is circumferentially delimited by edges that extend axially.

Second cage heel 52 is axially oriented towards the interior of rolling bearing 18, the slots 42 being axially arranged within the rolling chamber 40. Slots 42 are then open for receiving lubricant supplied into the rolling chamber 40. Furthermore, cage heel 52 with slots 42 is oriented towards the lubrication duct 28e provided on the outer ring and towards the annular groove 26g provided on inner ring 26. The lubricant injected towards the vicinity of balls 30 is efficiently directed to the balls by the lubrication duct orientation, by the groove inclination, and by the slots that allow the lubricant flow directly towards the balls housed in pockets.

Figure 3:
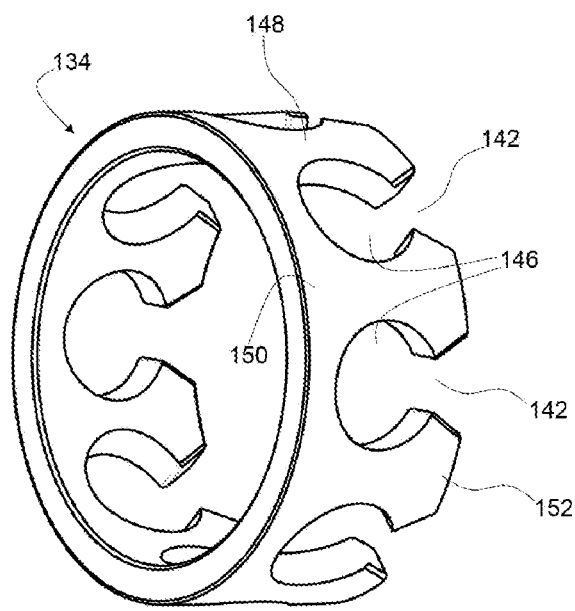
FIG. 3 is a perspective view of a cage according to a second embodiment of the invention.

A second embodiment of the invention is illustrated in FIG. 3 with a cage 134 comprising a plurality of pockets 146 formed through the radial cage thickness, the pockets 146 being cylindrical in the radial direction and adapted to receive each a ball. Each pocket 146 is circumferentially separated to the adjacent one by a spacing portion 148.

Pockets 146 are axially delimited by a first cage heel 150 on one axial side and by a second cage heel 152 on the opposite axial side of cage 134.

According to the invention, each of pockets 146 is extended by a slot 142 through the second cage heel 152. Each slot 146 has edges that extend each obliquely in opposite directions from the pocket through the cage heel so as to form a dovetail shape. The opening for lubricant is of increased size to allow a better introduction within slot.

Figure 4:
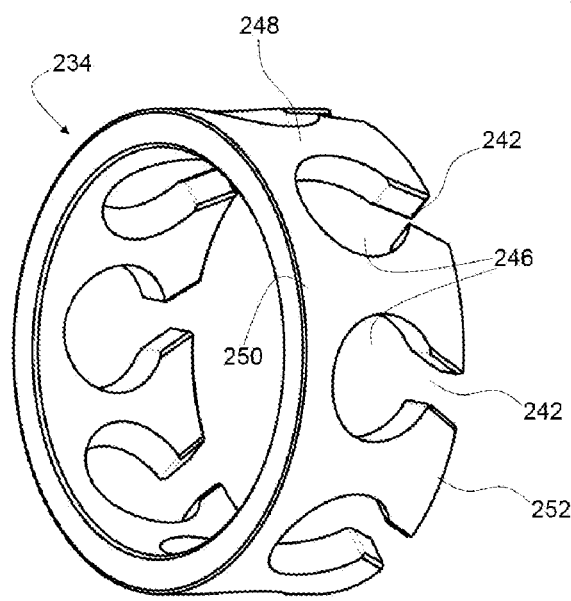
FIG. 4 is a perspective view of a cage according to a third embodiment of the invention.

A third embodiment of the invention is illustrated in FIG. 4 with a cage 234 comprising a plurality of pockets 246 formed through the radial cage thickness, the pockets 246 being cylindrical in the radial direction and adapted to receive each a ball. Each pocket 246 is circumferentially separated to the adjacent one by a spacing portion 248.

Pockets 246 are axially delimited by a first cage heel 250 on one axial side and by a second cage heel 252 on the opposite axial side of cage 234.

According to the invention, each of pockets 246 is extended by a slot 242 through the second cage heel 252. Each slot 246 has edges that extend parallelly and obliquely in one direction from the pocket 146 through the cage heel 52.

Advantageously, oblique slots are all oriented in the same direction as the rotation direction of the inner ring 26. The rotation speed of inner ring 26 induces a flowing movement of lubricant radially outwardly by centrifugal effect. The orientation of cage slots 42 permits an improved entry for lubricant with the slots 42. The lubrication of balls is then optimized.

Representative, non-limiting examples of the present invention were described above in details with reference to the attached drawings. This details description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provided improves radial bearing assemblies.

Moreover, various features of the above-described representative examples, as well as the various independent and dependant claims below, may be combined in ways that are not specifically and explicitly enumerated in order to provide additional useful embodiments of the present teachings.

What is claimed is:

1. A turbocharger comprising:
a rotatable shaft having a longitudinal axis,
a stationary housing,
a turbine wheel mounted on one end of shaft,
a compressor wheel mounted onto an opposite end of shaft, and
at least one rolling bearing disposed between the shaft and the housing, and having a stationary outer ring fixed to the housing, a rotatable inner ring fixed to the shaft, at least one row of balls disposed in a rolling chamber defined between the outer ring and inner ring, and a non-deformable annular metal cage and including circumferentially a plurality of through holes forming pockets where the balls are housed, the pockets being delimited between first and second annular cage heels, wherein
each pocket of the cage having an unobstructed slot extending therefrom in a direction parallel to the longitudinal axis and through the second annular cage heel towards the interior side of turbocharger, wherein each slot has first and second linear edges that each extend askew to the longitudinal axis and, as the first and second linear edges extend outwardly from each pocket, the first and second linear edges move in different circumferential directions such that each slot forms a dovetail shape, the second annular cage heel located between adjacent slots being perpendicular to the longitudinal axis and parallel to the first annular cage heel.

2. The turbocharger according to claim 1, wherein at least one lubrication duct is provided through the stationary outer ring to supply lubricant in the rolling chamber.

3. The turbocharger according to claim 2, wherein the lubrication duct extends obliquely along an injection direction towards the vicinity of balls of rolling bearing.

4. The turbocharger according to claim 2, wherein the inner ring comprises at least one annular groove with an inclined wall and in the axial vicinity of the balls of rolling bearing.

5. The turbocharger according to claim 1, wherein the cage is cylindrical.

6. The turbocharger according to claim 5, wherein a cage radial thickness is between twenty percent (20%) and fifty percent (50%) of balls diameter.

7. The turbocharger according to claim 6, wherein the cage radial thickness is equal to thirty-seven point five percent (37.5%) of balls diameter.

* * * * *